United States Patent [19]

Cesark

[11] 4,321,207

[45] Mar. 23, 1982

[54] PROCESS FOR PREPARING TRIARYLMETHANE DYES

[75] Inventor: Frank F. Cesark, Bridgewater, N.J.

[73] Assignee: American Cyanamid Company, Stamford, Conn.

[21] Appl. No.: 164,639

[22] Filed: Jun. 30, 1980

[51] Int. Cl.³ .................... C09B 11/10; C07D 251/54
[52] U.S. Cl. .................................... 260/391; 260/393; 546/196
[58] Field of Search ............... 260/391, 392, 388, 390, 260/386, 326.14, 326.15, 319.1; 546/152, 196

[56] References Cited

U.S. PATENT DOCUMENTS

| | | | |
|---|---|---|---|
| 2,121,928 | 6/1938 | Basel | 260/393 |
| 3,828,071 | 8/1974 | Kast et al. | 546/152 |
| 4,211,436 | 7/1980 | Kuhlthau et al. | 260/393 |
| 4,211,716 | 7/1980 | Hermann et al. | 260/391 |

Primary Examiner—Winston A. Douglas
Assistant Examiner—Raymond K. Covington
Attorney, Agent, or Firm—Bruce F. Jacobs

[57] ABSTRACT

A process for the preparation of triphenylmethane compounds by oxidation using as the catalyst a mixture of vanadium and molybdenum in a solvent medium of acetic acid plus a cosolvent.

8 Claims, No Drawings

PROCESS FOR PREPARING TRIARYLMETHANE DYES

This invention relates to a process for preparing triphenylmethane dyes. More particularly, it relates to a process for the preparation of a triphenylmethane dye, or a mixture of triphenylmethane dyes, represented by Formula (I)

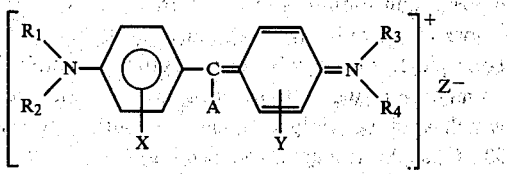

wherein $R_1$, $R_2$, $R_3$, and $R_4$ are independently hydrogen, alkyl ($C_1$–$C_6$), cycloalkyl ($C_5$–$C_6$), aryl ($C_6$–$C_{10}$), aralkyl ($C_7$–$C_{11}$), or substituted alkyl, cycloalkyl, aryl, or aralkyl wherein the substituents are selected from alkyl ($C_1$–$C_6$), alkoxy ($C_1$–$C_6$), cyano, carbalkoxy ($C_1$–$C_6$), halo, or hydroxy, or $R_1$ and $R_2$, and/or $R_3$ and $R_4$, together with the nitrogen to which they are attached form a heterocyclic ring containing 4 or 5 carbon atoms; X and Y are independently hydrogen, halogen, alkyl ($C_1$–$C_6$), or alkoxy ($C_1$–$C_6$); A is carbocyclic aryl ($C_6$–$C_{10}$), or substituted carbocyclic aryl wherein the substituents are selected from alkyl ($C_1$–$C_6$), halo, hydroxy, N-alkylamino, N,N-dialkylamino, N-(alkoxyalkyl)amino, N-(hydroxyalkyl)amino, N-(cyanoalkyl)amino, sulfo, carbocyclic aryl ($C_6$–$C_{10}$), or heterocyclic aryl ($C_5$–$C_9$); and $Z^-$ is an anion; comprising heating a compound, or mixture of compounds of Formula (II)

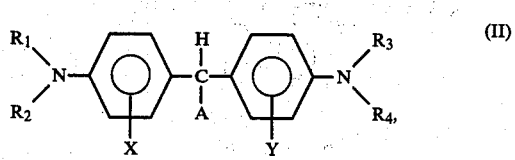

or a combination of a compound, or mixture of compounds, of Formula (III)

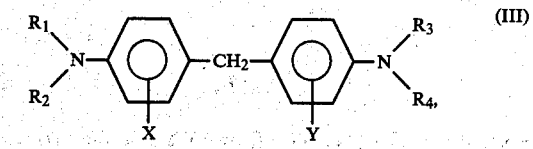

and a compound, or mixture of compounds, of Formula (IV)

A—H      (IV), with air, or oxygen, at about 40°–75° C. in the presence of a substituted benzoquinone, and an oxygen-activating catalyst comprising a mixture of vanadium and molybdenum in ionic form, in a solvent medium comprising 20% to 90% by weight of acetic acid and 80% to 10% by weight of a cosolvent, and recovering the dye product as a solution, or, optionally as a solid.

The preparation of basic dyes of Formula (I) by the catalytic oxidation of the leuco compound of the dye, (Formula II) or a mixture of a diarylmethane base (Formula III) and a compound of Formula (IV), in the presence of an electronegatively substituted benzoquinone, such as chloranil, and an oxygen-activating organometallic complex in which a metal selected from the group consisting of copper, vanadium, molybdenum, iron, or cobalt is chelated with an oxygen or nitrogen atom of a chelate-forming organic compound, in a solvent or aqueous suspension is disclosed by Kast et al. in U.S. Pat. No. 3,828,071, with compounds of specific structures.

Compounds of Formulas (II) and (III), which may be used in the process of this invention, include those wherein $R_1$, $R_2$, $R_3$, and $R_4$ are hydrogen, methyl, ethyl, n-hexyl, 2-ethylhexyl, cyclopentyl, cyclohexyl, 2-ethylcyclohexyl, 2-hydroxyethyl, 3-hydroxypropyl, 2-hydroxypropyl, 2-methoxyethyl, 2-ethoxyethyl, 2-cyanoethyl, 2-acetoxyethyl, 2-chloroethyl, phenyl, benzyl, p-tolyl, p-methoxyphenyl, p-carboxyphenyl, o-chlorophenyl, p-hydroxyphenyl, p-cyanophenyl, and the like; and X and Y are hydrogen, chloro, bromo, methyl, n-butyl, 2-ethylbutyl, methoxy, ethoxy, n-hexyloxy, and the like.

Compounds of Formulas (II) and (III) include those wherein $R_1$ and $R_2$ and/or $R_3$ and $R_4$, together with the nitrogen to which they are attached, form a ring such as piperidino, morpholino, and the like.

Compounds of Formulas (II) and (III) include those wherein A is phenyl, 1-naphthyl, o-tolyl, p-methoxyphenyl, p-hydroxyphenyl, o-carboxyphenyl, o-chlorophenyl, p-sulfophenyl, p-methylaminophenyl, p-n-butylaminophenyl, p-dimethylaminophenyl, p-diethylaminophenyl, p-(2-hydroxyethylamino)phenyl, p-(2-cyanoethylamino)phenyl, 3-methyl-4-N-ethylaminophenyl, 3-methyl-4-N-(2-hydroxyethylamino)phenyl, p-biphenyl, p-pyridylphenyl, and the like.

The preferred starting materials are those compounds of Formulas (II), (III), and (IV) wherein $R_1$, $R_2$, $R_3$, and $R_4$ are alkyl ($C_1$–$C_4$), X, and Y are hydrogen, and A is selected from p-dimethylaminophenyl, p-diethylaminophenyl, p-(2-hydroxyethylamino)phenyl and 3-methyl-4-(ethylamino)phenyl.

Suitable oxygen activating catalysts include solutions of vanadium and molybdenum ions in an acidic medium, preferably hydrochloric acid, containing about 22% by weight of the vanadium and 5.4% of the molybdenum oxide. These solutions are added to the reaction mixture to provide about 0.1 to 0.3% by weight, preferably about 0.025% by weight of vanadium pentoxide, and about 0.1 to 0.3% by weight, preferably about 0.2% by weight, of molybdenum oxide based on the weight of the reaction mixture. The substituted benzoquinones used as the oxidizing agent are well-known in the art and are predominantly halo or cyano benzoquinones. Examples of such compounds include:
- tetrafluoro-1,4-benzoquinone
- tetrabromo-1,4-benzoquinone
- tetrachloro-1,4-benzoquinone
- dichlorodicyano-1,4-benzoquinone
- tetracyano-1,4-benzoquinone
- tetrachloro-1,2-benzoquinone
- tetrabromo-1,2-benzoquinone The most preferred benzoquinone is tetrachloro-p-benzoquinone, which is also known as chloranil.

Examples of anions $Z^-$ are bromide, tetrafluoroborate, formate, methosulfate, ethosulfate, chloride, nitrate, acetate and tetrachlorozincate. Other such anions which do not deleteriously effect the reaction may also be used.

As previously mentioned, the solvent medium consists of about 20–90% by weight of acetic acid and about 80%–10% by weight of a cosolvent. Suitable cosolvents include such as 2-ethoxyethyl acetate, 2-ethoxypropyl acetate, ethyl acetate, 2-ethoxyethanol, 2-methoxyethanol, chlorobenzene, o-dichlorobenzene, toluene, chloroform, and the like. The preferred solvent medium contains about 80% by weight of acetic acid and about 20% by weight of 2-ethoxyethyl acetate.

The process may be carried out by passing air or oxygen through the reaction mixture at about 40°–75° C. at atmospheric or superatmospheric pressure. Preferably, the process is carried out in an autogenous pressure reactor at about 45°–55° C. using chloranil as the oxidizing agent and an oxidizing catalyst mixture of vanadium and molybdenum oxides and hydrochloric acid in a solvent medium preferably consisting of about 4 parts by weight of acetic acid and one part by weight of 2-ethoxyethyl acetate.

The product obtained is a solution containing about 40–55% by weight of a basic dye in the mixture of solvents. Optionally, the dye may be obtained as a solid by distilling off most of the cosolvent and recovering the solid.

The triarylmethane dyes of the present invention may also be prepared by preparing the leuco compound in situ and carrying out the oxidation step.

In a similar manner, the dyes may be prepared by preparing the methane base in a suitable mixture of acetic acid and a cosolvent. For example, Crystal Violet can be prepared by preparing the methane base from dimethylaniline and formaldehyde (37% by weight) in a mixture of 4 parts by weight of acetic acid and one part by weight of 2-ethoxyethyl acetate and subsequently carrying out the oxidation step utilizing the resulting solution.

The following examples illustrate the process of this invention. All parts and percents are by weight unless otherwise indicated.

EXAMPLE 1

Preparation of Vanadium Catalyst

Vanadium pentoxide (349.5 grams) is stirred with water (257 grams) and a reducing sugar (90.8 grams; Cerelose Dextrose). Concentrated hydrochloric acid (894 grams of 22° Be) is then added to the mixture over about 4 hours and stirring is continued until a clear solution is obtained.

EXAMPLE 2

Preparation of Molybdate Catalyst

Sodium molybdate dihydrate (476 grams) is dissolved in water (5,834 grams) and 22° Be hydrochloric acid (2500 grams) is added thereto. The solution is then agitated until well-blended. The resulting solution contains 1.84% by weight of $H_2MoO_4$.

EXAMPLE 3

The following examples illustrates the preparation of Malachite Green.

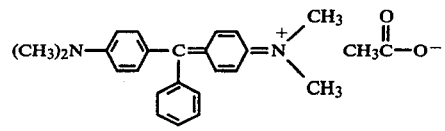

Acetic acid (840 grams), 2-ethoxyethyl acetate (210 grams), Malachite Green Leuco form (792 grams; 2.4 moles), concentrated hydrochloric acid (80 grams), chloranil (20 grams), vanadium catalyst (24 grams) of Example 1, and molybdate catalyst of Example 2 (74 grams) are charged to an autogenous pressure reactor which is subsequently sealed and pressurized with air to 50–80 psi. Air is then introduced into the reactor at 5 cu ft/hr while agitating the reaction mixture vigorously at 50° C. After agitating at 50° C. for 4 hours, the reaction mixture is cooled to 25° C., vented, and the contents discharged and diluted with water to obtain 2160 grams of a solution containing about 38.5% by weight of dye product. The yield of real dye product is 95% of theoretical.

In a similar manner, dyestuffs are prepared by substituting 2.4 moles of the leuco compounds of the formulas

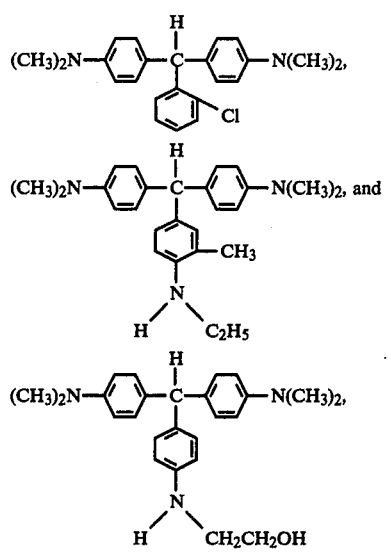

respectively for the leuco form of Malachite Green.

EXAMPLE 4

The following example illustrates the superior yield of Crystal Violet,

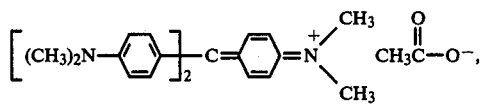

obtained by using a solvent mixture of acetic acid and 2-ethoxyethyl acetate of the present invention.

To an autogenous pressure reactor are charged 25.4 grams (0.0998 mole) of a methane base of the formula

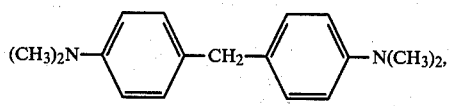

acetic acid (60 grams), 2-ethoxyethyl acetate (15 grams), N,N-dimethylaniline (15.1 grams; 0.125 mole), chloranil (1 gram), molybdate catalyst (2.5 grams of a 16.7% by weight solution of $Na_2MoO_4$ in water), vanadium catalyst (2.5 grams of the product of Example 1), and concentrated hydrochloric acid (1 gram). The reactor is then sealed and pressurized with oxygen to 40 psi, heated to 60° C., and agitated at 60°–70° C. for one-half hour. The reactor is then vented and the contents discharged. The reactor is then rinsed with acetic acid and the rinsing is combined with the reaction product to obtain a solution (216.7 grams) containing 19.4% by weight of dye product. The yield of product is 97.6% of theoretical.

In a similar manner, a dye product is prepared by utilizing 28.2 grams of a methane base of the formula

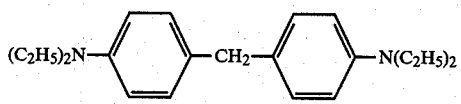

and 18.6 grams of N,N-diethylaniline.

EXAMPLE 5

The following example illustrates the low yield obtained by preparing Crystal Violet in only acetic acid.

The procedure of Example 4 is followed in every detail except that the reaction is carried out utilizing 75 grams of acetic acid and no 2-ethoxyethyl acetate, and the reaction mixture is heated for one hour before discharging. There is obtained 198.8 grams of a solution containing 17% by weight of dye product. The yield is 78.5% of theoretical.

EXAMPLE 6

The following example illustrates the very low yield obtained by preparing Crystal Violet in a mixture of 2-ethoxyethyl acetate and acetic acid which is more than 80% 2-ethoxyethyl acetate.

The procedure of Example 4 is followed in every detail except that 6 grams of acetic acid and 69 grams of 2-ethoxyethyl acetate are used, the reaction mixture is heated for five (5) hours, and the reactor is rinsed with acetic acid to obtain 367.5 grams of a solution containing 3.75% by weight of due product. The yield obtained is only 32.0% of theoretical.

EXAMPLE 7

The following example illustrates the process utilizing a solvent medium consisting of 80% 2-ethoxyethyl acetate and 20% acetic acid.

The process of Example 4 is followed in every detail except that the solvent is a mixture of 2-ethoxyethyl acetate (60 grams) and acetic acid (15 grams), and the reaction mixture is heated at 60°–70° C. for three (3) hours. After venting, and discharging, the reactor is rinsed with acetic acid (47.2 grams), and the rinsing is combined with the reaction mixture to obtain a solution (173.6 grams). Analysis of the solution shows that the yield of product is 67% of theoretical.

EXAMPLE 8

The following example illustrates the lower yield obtained by preparing Crystal Violet with only vanadium as the catalyst.

The procedure of Example 4 is followed in every detail except that the reaction is carried out utilizing only the vanadium catalyst (5.0 grams of the product of Example 1), and the reaction mixture is heated at 60°–70° C. for one and one-half hours. After venting, and discharging, the reactor is rinsed with acetic acid (45.6 grams), and the rinsing is combined with the reaction mixture to obtain a solution (173.4 grams). Analysis of the solution shows that the yield of product is 78% of theoretical.

EXAMPLE 9

The following example illustrates the very low yield obtained by preparing Crystal Violet with only molybdenum as the catalyst.

The procedure of Example 4 is followed in every detail except that the reaction is carried out utilizing only the molybdenum catalyst (5.0 grams of the product of Example 2), and the reaction mixture is heated at 60°–70° C. for three hours. After venting and discharging, the reactor is rinsed with acetic acid (32.7 grams), and the rinsing is combined with the reaction mixture to obtain a solution (158.7 grams). Analysis of the solution shows that the yield of product is only 17% of theoretical.

EXAMPLE 10

The following example illustrates the preparation of Crystal Violet by preparing the leuco form in situ.

Acetic acid (840 grams), 2-ethoxyethyl acetate (210 grams), 4,4'-methylenebis(N,N-dimethylaniline) (508 grams; 2.0 moles), N,N-dimethylaniline (303 grams; 2.5 moles), chloranil (20 grams), vanadium catalyst (24 grams) of Example 1, and molybdate catalyst (74 grams) of Example 2, are charged to an autogenous pressure reactor, pressurized, and heated as described in Example 3. The discharged reaction mixture is diluted with water to obtain 2020 grams of a solution containing 39.6% by weight of dye product. The yield of real dye product is 92.7% of theoretical.

EXAMPLE 11

The following example illustrates the use of o-dichlorobenzene as a cosolvent in the preparation of Crystal Violet, and the isolation of the dye as a solid.

To an autogenous pressure reactor are charged acetic acid (420 grams), o-dichlorobenzene (1125 grams), 4,4'-methylenebis(N,N-dimethylaniline) (381 grams; 1.5 moles), N,N-dimethylaniline (182 grams; 1.5 moles), chloranil) (15 grams), and molybdate (37.5 grams) and vanadium (37.5 grams) catalysts of Examples 1 and 2. The reactor is pressurized with air to 80 psi and the reaction mixture is vigorously agitated at 60°–65° C. while introducing air therein. After agitating at 60°–65° C. for five (5) hours, the reactor is opened and the contents discharged to obtain 2218 rams of solution which contains 29.9% by weight of Crystal Violet. The yield of product is essentially 100% of theoretical.

The solution is mixed with an equal weight of water and the o-dichlorobenzene is steam-distilled from the mixture. The dye is then salted out by saturating the residual solution with sodium chloride and cooling. The resulting precipitate is then separated by filtration and dried to obtain solid Crystal Violet.

EXAMPLE 12

The following example illustrates the preparation of the methane base of Crystal Violet in a medium which is subsequently used in the oxidation reaction.

A solution is prepared by mixing dimethylaniline (145.5 grams; 1.20 moles), acetic acid (252.0 grams), and 2-ethoxyethyl acetate (63.0 grams). Formaldehyde (48.6 grams of 37% by weight), is added, over 30 minutes, to the solution while agitating and maintaining the temperature at 30°–50° C.

A portion of the solution (84.9 grams), N,N-dimethylaniline (7.6 grams; 0.063 mole), N-ethylaniline (7.6 grams; 0.063 mole), chloranil (1.0 grams), the vanadium catalyst of Example 1 (1.2 grams), and molybdate catalyst (2.7 grams), prepared by mixing 20 grams of sodium molybdate dihydrate, 150 grams of water, and 100 grams of concentrated hydrochloric acid. The reactor is then sealed, pressurized with oxygen to 40 psi and heated at 70°–80° C. for 45 minutes. The reaction mixture is then cooled to room temperature, discharged and diluted with acetic acid to obtain 191.5 grams of solution containing 20.13% by weight of dye product. The yield is 97.8% of theoretical.

EXAMPLE 13

The following example illustrates the preparation of a solution of a dye mixture consisting of about 30% by weight of Crystal Violet and about 70% by weight of a compound of the formula

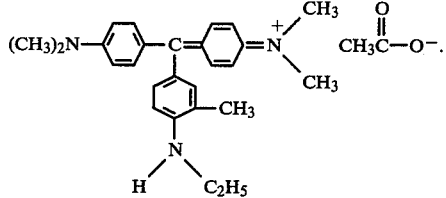

To an autogenous pressure reactor are charged acetic acid (840 grams), 2-ethoxyethyl acetate (210 grams), 4,4'-methylenebis(N,N-dimethylaniline) (508 grams; 2.0 moles), N,N-dimethylaniline (91 grams; 0.75 mole), N-ethyl-o-toluidine (237 grams; 1.75 moles), chloranil (20 grams; 0.08 mole), vanadium catalyst (24 grams) of Example 1, and molybdate catalyst (74 grams) of Example 2. The reactor is sealed, pressurized with air to 80 psi, and the contents heated to 50° C. while agitating vigorously and introducing air at 5 cu ft/hr for a period of six (6) hours. The contents are then discharged to obtain 2051 grams of a solution containing about 40% by weight of dye product. The yield is about 98% of theoretical.

EXAMPLE 14

The following example illustrates the preparation of a solution of a dye which consists of about 42% by weight of Crystal Violet and about 58% by weight of a compound of the formula

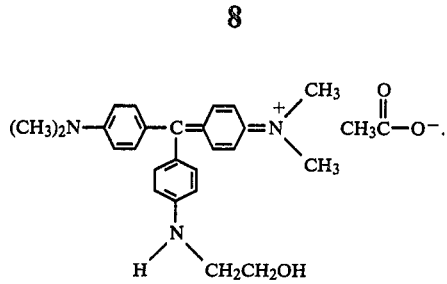

To an autogenous pressure reactor are charged 2-ethoxyethyl acetate (210 grams), acetic acid (840 grams), 4,4'-methylenebis(N,N-dimethylaniline) (508 grams; 2.0 moles), N,N-dimethylaniline (137 grams; 1.13 moles), N-2-hydroxyethylaniline (190 grams; 1.38 mole), chloranil (20 grams), and molybdate catalyst (74 grams) and vanadium catalyst (24 grams) of Example 1. The reactor is sealed and pressurized with air to 80 psi. The reaction mixture is then heated to 50° C. and air is introduced at 5 cu ft/hr, while vigorously agitating and maintaining the temperature at 50° C. for 5 hours. The reaction mixture is then discharged and diluted with water to obtain 2061 grams of a solution containing 39.5% real dye. The yield is 95% of theoretical.

What is claimed is:

1. A process for preparing triphenylmethane dyes of the formula (I)

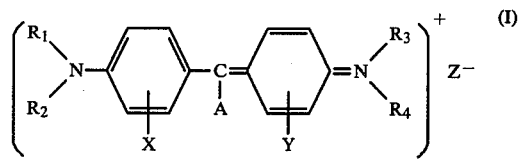

wherein $R_1$, $R_2$, $R_3$, and $R_4$ are independently hydrogen, alkyl ($C_1$–$C_6$), cycloalkyl ($C_5$–$C_6$), aryl ($C_6$–$C_{10}$), aralkyl ($C_7$–$C_{11}$), or substituted alkyl, cycloalkyl, aryl, or aralkyl wherein the substituents are selected from alkyl ($C_1$–$C_6$), alkoxy ($C_1$–$C_6$), cyano, carbalkoxy ($C_1$–$C_6$), halo or hydroxy, or $R_1$ and $R_2$, and/or $R_3$ and $R_4$, together with the nitrogen to which $R_1$ and $R_2$ and/or $R_3$ and $R_4$ are attached form a heterocyclic ring containing 4 or 5 carbon atoms; X and Y are independently hydrogen, halogen, alkyl ($C_1$–$C_6$), or alkoxy ($C_1$–$C_6$); A is carbocyclic aryl ($C_6$–$C_{10}$), or substituted carbocyclic aryl wherein the substituents are selected from alkyl ($C_1$–$C_6$), N-alkylamino, N,N-dialkylamino, N-(hydroxyalkyl)amino, N-(alkoxyalkyl)amino, N-cyanoalkylamino, sulfo, carbocyclic aryl ($C_6$–$C_{10}$), or heterocyclic aryl ($C_5$–$C_9$); and $Z^-$ is an anion; comprising heating a compound, of formula (II)

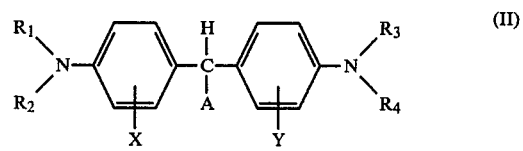

or a combination of a compound of formula (III)

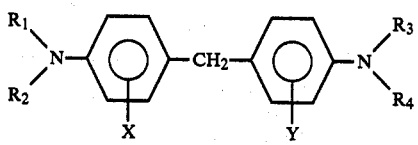

and a compound, of formula (IV)

A—H          (IV), with an oxygen-containing gas under atmospheric or autogenous pressure in the presence of a catalytic amount of a fluoro, chloro, bromo, or cyano-substituted benzoquinone, and an oxygen-activating catalyst comprising a mixture of vanadium and molybdenum, in ionic form, in a solvent medium comprising 20% to 90% by weight of acetic acid and 80% to 10% by weight of a cosolvent selected from the group consisting essentially of 2-ethoxyethyl acetate, chlorobenzene, o-dichlorobenzene, ethyl acetate, 2-ethoxyethanol, 2-methoxyethanol, and toluene, and recovering the reaction mixture containing the dye.

2. The process of claim 1 wherein $R_1$, $R_2$, $R_3$, and $R_4$ are alkyl ($C_1$–$C_6$), X and Y are hydrogen and A is selected from p-dimethylaminophenyl, p-diethylaminophenyl, 3-methyl-4-ethylaminophenyl, p-methylaminophenyl, p-(2-hydroxyethylamino)phenyl, phenyl, and o-chlorophenyl.

3. The process of claim 2 wherein $R_1$, $R_2$, $R_3$, and $R_4$ are methyl.

4. The process of claim 2 wherein $R_1$, $R_2$, $R_3$, and $R_4$ are ethyl and A is p-diethylaminophenyl.

5. The process of claim 3 wherein A is p-(2-hydroxyethylamino)phenyl.

6. The process of claim 3 wherein A is 3-methyl-4(ethylamino)phenyl.

7. The process of claim 3 wherein A is phenyl.

8. The process of claim 3 wherein A is o-chlorophenyl.